US005395148A

United States Patent [19]

Jameson et al.

[11] Patent Number: 5,395,148

[45] Date of Patent: Mar. 7, 1995

[54] MAGNETIC RAKE

[75] Inventors: Ali G. Jameson; Barbara S. Jameson, both of Malibu, Calif.

[73] Assignee: Electro-Wave Enterprises, Inc., Malibu, Calif.

[21] Appl. No.: 49,175

[22] Filed: Apr. 19, 1993

[51] Int. Cl.[6] .......................... B03C 1/00; B25J 15/06

[52] U.S. Cl. .................................... 294/65.5; 209/215

[58] Field of Search ................. 294/65.5; 15/105, 160; 209/213-216, 223.1, 228, 229; 335/285, 291, 293, 294, 296, 297, 301-303, 306

[56] References Cited

U.S. PATENT DOCUMENTS

| | | | |
|---|---|---|---|
| 2,417,762 | 3/1947 | Koller | 294/65.5 |
| 2,426,795 | 9/1947 | Sjostrom | 294/65.5 X |
| 2,648,434 | 8/1953 | Russell | 209/215 |
| 2,654,480 | 10/1953 | Stem | 209/215 |
| 2,693,279 | 11/1954 | Box et al. | 209/215 |
| 2,709,002 | 5/1955 | Hoff | 209/215 |
| 2,970,003 | 1/1961 | Heath et al. | 294/65.5 |
| 3,014,586 | 12/1961 | Ross | 209/215 |
| 3,206,783 | 9/1965 | Schwartz | 15/105 |
| 3,343,675 | 9/1967 | Budd | 209/215 |
| 3,377,641 | 4/1968 | McGregor | 294/65.5 X |
| 3,646,492 | 2/1972 | Westermann | 209/215 X |
| 4,407,038 | 10/1983 | Haase | 15/105 |

*Primary Examiner*—Johnny D. Cherry
*Attorney, Agent, or Firm*—John F. Sicotte

[57] ABSTRACT

A magnetic sweeping device includes an integral non-metallic housing with a longitudinal slot containing spaced apart magnets, the housing having a streamlined shape with rounded ends and having a non-metallic semi-circular cylindrical cuff with a diameter slightly smaller than the diameter of the housing. In use, the housing is directed over, under or in contact with a surface which bears ferro-metallic particles or debris. The debris is attracted to the surface areas of the housing which are immediately adjacent to the magnets. When sufficient debris has been collected on the surface of the housing, the cuff is slid across the housings surface pushing the debris toward one end of the housing. Since either end of the housing has an area where there is a magnetic flux void, the debris will freely fall off the housing to be collected.

14 Claims, 3 Drawing Sheets

MAGNETIC RAKE

BACKGROUND OF THE INVENTION

Magnetic sweeping devices are known in the prior art and have been used in a variety of situations involving the collection of ferro-materials. Generally speaking, the magnetic rake is held a certain distance above the surface to be cleaned and then moved slowly over the surface in order to attract the metal particles to the surface of the rake.

It is known, for example, to form a magnetic sweeper or collector by placing a plurality of magnets within a non-magnetic tube which is mounted as an axle between two wheels. As the sweeper is moved across the floor, its magnets would attract metal particles or debris to the surface of the non-magnetic tube. Once the surface of the tube had become coated with a sufficient quantity of metal particles, the sweeper operator would slide a non-metal ring across the surface of the tube. This action would push the particles to one end of the tube where there was a flux void or area where there was no magnetic force. At this place on the tube, the particles would be released from the sweepers magnetic field and would drop into a container.

The present invention relates to an improved magnetic device which moves over the ground or floor surfaces to pick up ferro-magnetic materials. This device is an improvement upon and simplification of all previous devices. The purpose of this invention is to maintain direct contact with the surface it is raking and sweeping. With the exception of U.S. Pat. No. 3,206,783, which discloses a magnet attached to the leading surface of a floor squeegee, most magnetic sweeping devices are complex designs involving wheels, brushes and a multitude of moving parts. Pertinent prior art examples of such United States Patents are as follows:

| Inventor Name | Registration Number | Registration Date |
|---|---|---|
| Russell | 2,648,434 | 1953 |
| Stern | 2,654,480 | 1953 |
| Box | 2,693,279 | 1954 |
| Hoff | 2,709,002 | 1955 |
| Ross | 3,014,586 | 1961 |
| Budd | 3,343,675 | 1967 |
| Haase | 4,407,038 | 1983 |

Thus, another object of this invention is to provide a magnetic rake or sweeper that is simple in design and more reliable due to its lack of any moving parts other than a cleaning cuff.

Another object of this invention is to provide a magnetic rake or sweeping device that can be used beneath the surface where metal particles may collect. Due to its special streamlined housing, this invention makes it possible to be pushed over and partially into sand and dirt, as well as across the top of carpet areas or even hard surfaces.

An additional object of this invention is to provide a magnetic rake or sweeper that is light weight and easily cleaned due to its unitary construction and streamlined housing.

SUMMARY OF THE INVENTION

According to the present invention, the magnetic rake or sweeper is made in the form of a non-metallic material such as heavy-schedule plastic which is formed over a plurality of magnets arranged in a straight line. The plastic housing covers every surface of the magnet including the bottom areas. The plastic is then formed into a cylindrical housing having rounded ends. At the top center of the cylinder a handle is mounted which is used to guide the magnetic rake over the surface to be cleaned. Stored on the handle is a semi-circular cylindrical cleaning cuff which has an interior diameter slightly smaller than the plastic housing. The cuff is lined with a felt like material.

In use, the magnetic rake is placed on the floor, such as the area around a metal turning lathe in a machine shop. The rake is pushed forward and pulled backward into the metal debris and then lifted from the floor. The rake operator then places the cleaning cuff onto and around one end of the plastic magnetic housing. As the operator pushes the cuff forward across the magnetic housing, the metal particles are driven toward the opposite end of the housing. When the particles reach the opposite end, they begin to drop off at the point where there is no longer any magnetic flux. This point is generally just inside the rounded end of the housing. The cuff may be slipped onto the housing from either direction, thus facilitating its use. In lieu of a cleaning cuff, the operator can also use a gloved hand for this cleaning process; however, it is not the best method for wiping the housing clean of metallic particles.

Figure 1:
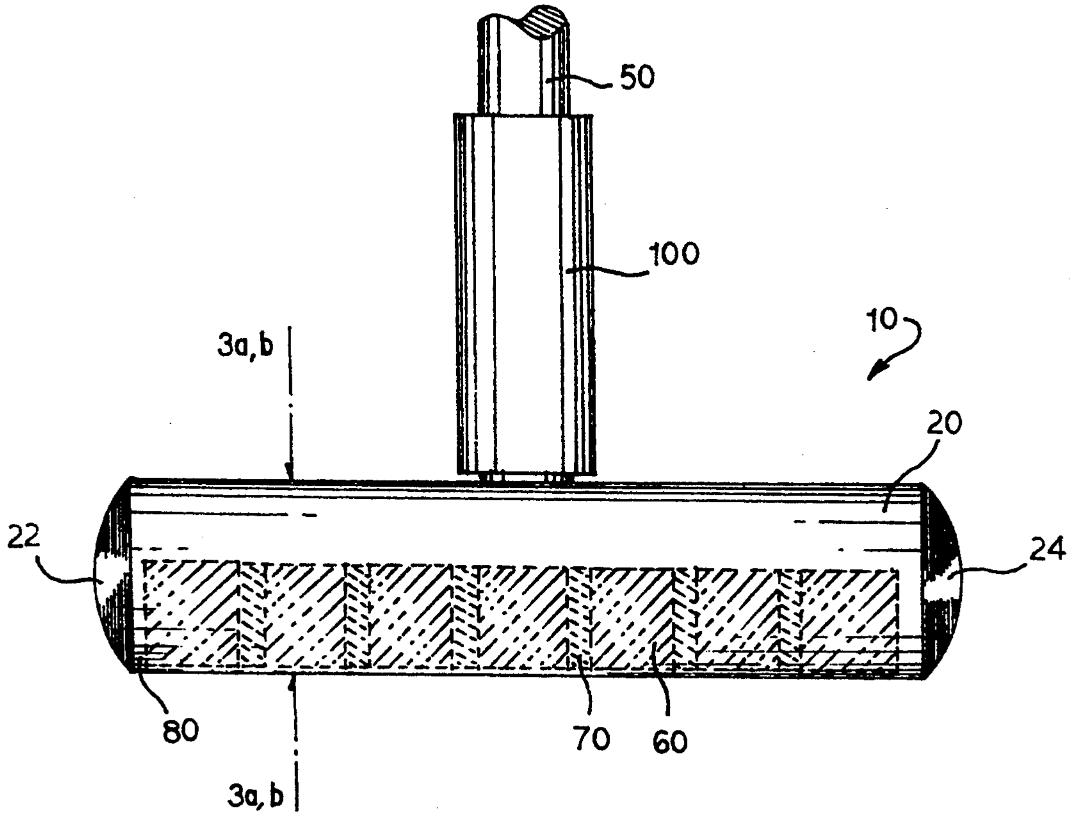
FIG. 1 is a front elevational view, partially in phantom, of the preferred form of the magnetic rake.
Figure 4:
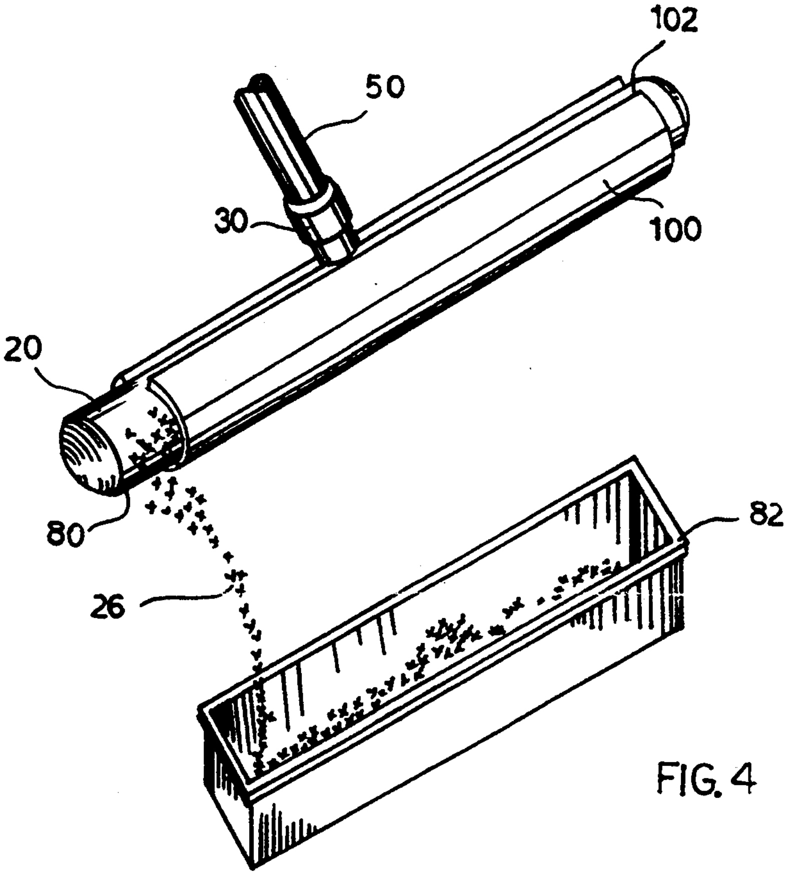

FIG. **3*a*** is a cross-sectional view, taken on line 3*a*—3*a* of FIG. 1, which shows a magnet which has a rectangular cross-section;

FIG. **3*b*** is a cross-sectional view, taken on line 3*b*—3*b*, of a magnetic rake housing which contains a magnet with a circular cross-section;

FIG. 4 is a perspective view of a magnetic rake housing being cleaned and the metal debris being collected for disposal or recycling.

Figure 5:
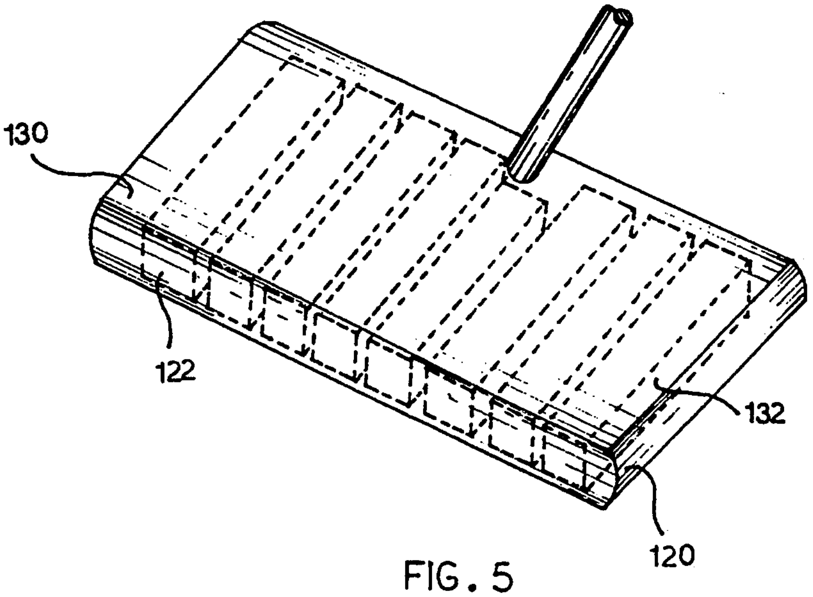
Figure 6:
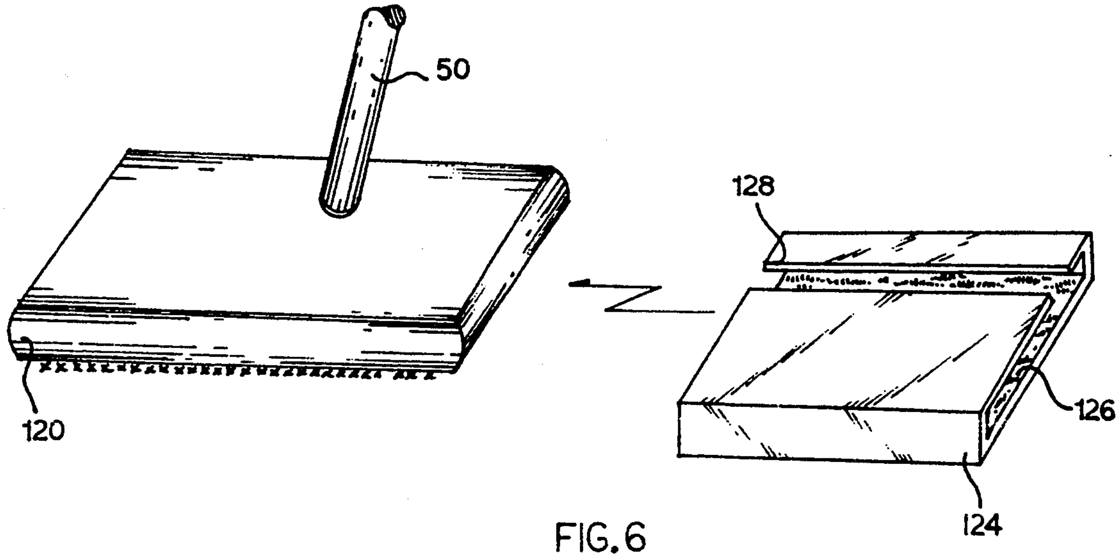

FIG. 5 is a perspective view, partially in phantom, of the second embodiment of the invention;

FIG. 6 is a perspective view of the second embodiment of the invention being used in conjunction with a cleaning cuff.

DETAILED DESCRIPTION OF THE PREFERRED EMBODIMENT

The present invention now will be described more fully hereinafter with reference to the accompanying drawings in which the preferred embodiments of the invention are shown.

Referring now to the drawings, FIG. 1 is a perspective view of the preferred embodiment of the invention. Rake 10 includes housing 20 having rounded ends 22 and 24. A handle 50 is attached to housing 20. Mounted on handle 50 is cuff holder 30 which is in the shape of an annular ring around handle 50. Cuff holder 30 provides a storage mount for a cleaning cuff (described below) when it is not in use.

More specifically, housing 20 is of generally cylindrical configuration. Its axial length is typically about 16 to 20 inches. Its exterior diameter must be sufficient to contain the type of magnets being employed plus enough material to give housing 20 sufficient structural strength. In the preferred embodiment, housing 20 is formed from a non-metallic material, such as high strength plastic like polystyrene, which can be formed around a plurality of magnets. As can be seen in FIG. 1, rake 10 has a housing 20 which contains a straight line of magnets 60 each separated by a partition 70. Also, it can be seen that at each end of the row of magnets there is a flux free zone 80 between the end of the row of magnets and housing ends 22 and 24. The purpose of having such an area in the housing is important because it creates a flux free zone. Such a zone is essential to efficient operation of the invention because it allows metal particles which have been collected on housing 20 to be slid smoothly to a non-magnetic area, whereupon they may drop off and be collected. FIG. 4 demonstrates this important function of the invention. It can be clearly seen that as cleaning cuff 100 slides across housing 20, metal particles 26, which had been collected, will be pushed along until they reach flux free zone 80 whereupon they drop off and into collector box 82.

Figure 2:
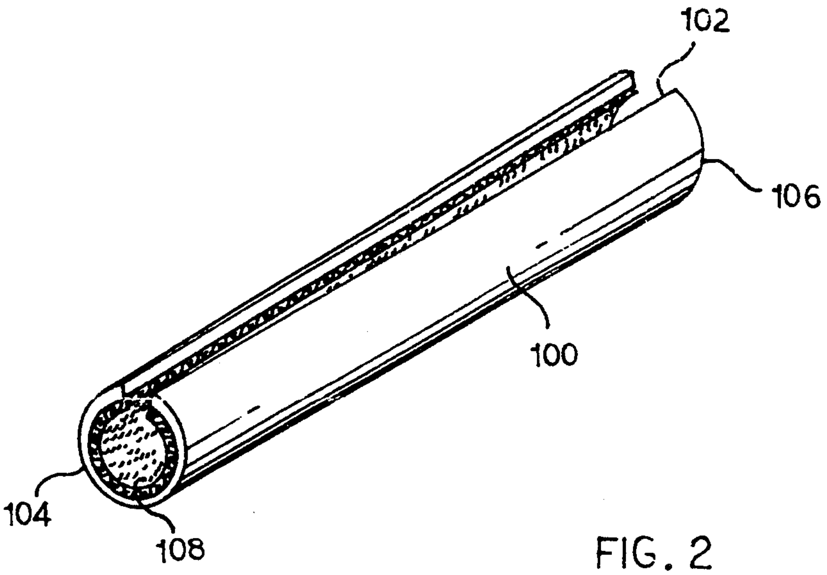
FIG. 2 is a perspective view of the cleaning cuff containing a longitudinal slot which is designed to clear the handle as it slides across the housing.
Figure 3A:
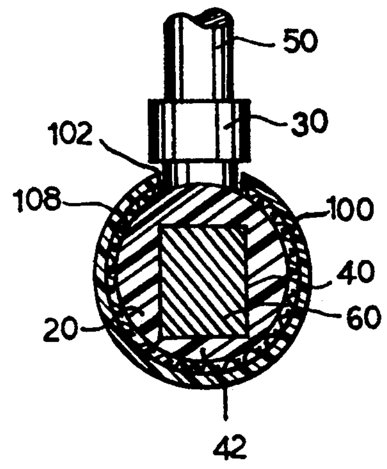

FIG. 2 shows cleaning cuff 100 in detail. It is cylindrical in shape with a longitudinal slit 102 running from open end 104 to opposite end 106. Cuff 100 is lined with a soft felt-like material 108 which entirely covers the cuff's inner surface except for the longitudinal slit 102. Since cuff 100 is used to clean the surface of housing 20, the inside diameter of cuff 100 is slightly less than the outside diameter of housing 20. When cuff 100 is placed over housing 20, it will place a slight inward pressure over the surface of housing 20. This pressure or gripping action will provide an efficient method of cleaning the outside surface of housing 20. It should be noted that longitudinal slit 102 allows cuff 20 to be slid across housing 20 without removing handle 50. In FIG. 3*a*, it can be seen that longitudinal slit at reference number 102 has a width which is greater than the diameter of handle 50. This allows cuff 100 to pass smoothly around handle 50. As cuff 100 passes over housing 20, a soft non-metallic material 108, such as felt, comes into direct contact with housing 20. The interface between the housing and the cuff is illustrated in FIG. 3*a*, which is a cross-sectional view taken along lines 3*a*—3*a* of FIG. 1. In FIG. 3*a*, felt-like material 108 of cuff 100 is shown to be in direct contact with the exterior surface of housing 20. It should be noted in FIG. 3*a*, that cuff holder 30 is located on handle 50 just above the point where cuff 100 will pass by handle 50. When cleaning cuff 100 is not being implemented, it may be stored on cuff holder 30. This is shown in FIG. 3*b*.

Referring again to FIGS. 3*a* and 3*b*, it should be noted that there can be two or more different shaped magnets which may be used in the present invention. FIG. 3*a* illustrates the first preferred embodiment of the invention having a rectangularly shaped magnet 60 which is contained in a rectangularly shaped cavity 40. FIG. 3*b* is a cross-sectional view of the second preferred embodiment of the invention which has a housing 21 containing a round or cylindrical shaped magnet 64. It also should be noted that housing 21 and the magnets were integrally formed. In the preferred embodiment, a non-metallic material, such as polystyrene, would be casted around a straight row of magnets so to completely cover each magnet. During the casting process, the non-metallic material would form a protective coating 42 below each of the magnets. Also during the casting process, the flow of the non-metallic material between each of the magnets would form an insulating partition. This insulating partition is indicated at 70 in FIG. 1.

ALTERNATIVE EMBODIMENTS

Figure 3B:
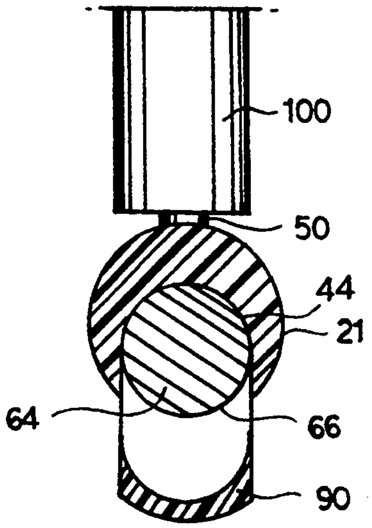

FIG. 3*b* illustrates an alternative embodiment of invention wherein the housing 21 is not integrally formed with the magnets. In this alternative embodiment, housing 21 is cast from a non-metallic material with a cavity or longitudinal slit 44 formed therein. Cavity 44 is formed within housing 21 when housing 21 is originally cast. Its shape and dimensions depend upon the number of magnets and shape of the magnets that it needs to accommodate. It must be understood that between each of the magnets a non-metallic partition 70 would need to be inserted between each of the magnets. In order to retain and to protect the magnets in the alternative embodiment, a separate cover 90 would be attached to housing 21. Cover 90 could be made of the same sort of non-metallic material as housing 21 or it could be made of a different material which is more appropriate to its functions as a retainer and protector.

Reference is now made to FIGS. 5 and 6 which illustrate another alternative embodiment of the invention including a modified form of the housing and a corresponding modified form of the cleaning cuff. As shown in FIG. 5, housing 120 has a generally flat rectangular design with curved edges and rounded sides. The purpose of the second embodiment is to provide a larger magnetic collecting surface. As can be seen in FIG. 5, magnets 122 can be arranged so as to have a larger surface area, thus a larger area of housing 120 available to collect metal particles. FIG. 6 shows the second embodiment of the invention in relationship with the modified cuff 124. As shown in FIG. 6, the inside surface of modified cuff 124 is lined with a soft felt-like material 126 which is shaped to conform to the outside dimensions of housing 120. It should be noted that modified cuff 124 has a longitudinal opening 128 which will clear handle 50 during the cleaning of housing 120. It should also be noted that housing 120 has been provided with left and right flux free zones, indicated at references 130 and 132, respectively.

The invention described above is, of course, susceptible to many variations, modifications and changes, all of which are within the skill in the art. It should be understood that all such changes are within the spirit and scope of the invention and of the appended claims. Similarly, it will be understood that this invention is intended to cover all changes, modifications and variations of the examples of the invention herein disclosed for the purpose of illustration which do not constitute departures from the spirit and scope of the invention.

What is claimed as new is:

1. A wheelless ferrous metal particle gathering device comprising:

a non-metallic housing with a smooth outer surface, having a cavity formed in one side of said outer surface of said housing;

said cavity containing a plurality of permanent magnets arranged in longitudinal alignment and separated from one another by non-magnetic material and from at least one end of said housing to form a magnetic flux free zone at said end;

a handle mounted on said housing; and, a cleaning cuff for removing metal particles from said housing by sliding said particles to said flux free zone.

2. The device of claim 1 wherein said housing is generally cylindrical in shape and said plurality of permanent magnets consist of magnets each having a substantially rectangular cross-sectional configuration.

3. The device of claim 2 wherein said cylindrical housing has rounded surfaces at either end.

4. The device of claim 1 wherein said housing is generally cylindrical in shape and said plurality of permanent magnets consist of magnets each having a substantially circular cross-sectional configuration.

5. The device of claim 4 wherein said cylindrical housing has rounded surfaces at either end.

6. The method of collecting ferro-metallic particles comprising the steps of:

a. selecting a collector having a cylindrical non-metallic housing with a smooth outer surface containing a plurality of permanent magnets in longitudinal alignment, each magnet being spaced apart from each neighboring magnet; said plurality of permanent magnets being covered by a non-magnetic material;

b. selecting an area containing ferrous metallic particles to be collected;

c. moving said collector beneath the surface of said area, allowing said particles to be collected over the surface of said housing; and, d. then removing said ferrous metallic particles from said housing by sliding a semi-cylindrical cleaning cuff over said outer surface of said housing so that the collected metal particles fall freely from one end of said housing.

7. A wheelless ferrous metal particle gathering device consisting of:

a. a cylindrical housing formed of a non-metallic material having a cavity formed in the exterior surface of said housing but which cavity does not extend the entire length of said housing;

b. said cavity containing a plurality of permanent magnets, each of said magnets being separated from a neighboring magnet by a non-metallic partition;

c. said plurality of magnets being separated from at least one end of said cylindrical housing to form a magnetic flux free zone at said end;

d. said plurality of said magnets being protected by a durable non-metallic removable cover over said cavity;

e. a handle means located on said housing; and f. a cleaning cuff for removing said metal particles from said housing by sliding said metal particles to said magnetic flux free zone.

8. A device of claim 7 wherein said housing has rounded surfaces at either end.

9. A device of claim 8 wherein said plurality of permanent magnets is comprised of magnets, each having a substantially circular cross-sectional configuration.

10. A device of claim 8 wherein said plurality of permanent magnets is comprised of magnets, each having a substantially rectangular cross-sectional configuration.

11. A wheelless ferrous metal particle gathering device comprising:

a non-metallic, substantially cylindrical, housing with a smooth outer surface having rounded surfaces at either end;

said housing containing a multitude of permanent magnets in longitudinal alignment, each magnet being separated from one another by a layer of non-metallic material and separated from at least one end of said housing such to form a flux free zone at said end;

a handle mounted on said housing; and a cleaning cuff for removing said ferrous metal particles from said housing by sliding particles to said flux free zone.

12. A device of claim 11 wherein said plurality of permanent magnets is comprised of magnets, each having a substantially circular cross-sectional configuration.

13. A device of claim 11 wherein said plurality of permanent magnets is comprised of magnets, each having a substantially rectangular cross-sectional configuration.

14. A wheelless ferrous metal particle gathering device consisting of:

a. a substantially rectangularly shaped housing being constructed of a non-metallic material, having smooth top and bottom surfaces and rounded edges;

b. said housing containing a multitude of permanent magnets, each magnet being separated from one another by a layer of non-metallic material and from at least one end of said housing to form a magnetic flux free zone at said end;

c. a handle mounted on said top surface;

d. a cleaning cuff having a soft felt-like lining and shaped to conform to the outside of said housing.

* * * * *